United States Patent [19]

Bradshaw et al.

[11] 3,748,777
[45] July 31, 1973

[54] WATER-ACTIVATED INSECT TRAP
[75] Inventors: Thomas Ian Bradshaw, Shoreview; Morgan J. Tamsky, Saint Paul, both of Minn.
[73] Assignee: Minnesota Mining and Manufacturing Company, St. Paul, Minn.
[22] Filed: May 15, 1972
[21] Appl. No.: 253,164

[52] U.S. Cl. ................................................. 43/114
[51] Int. Cl. ........................................... A01m 1/18
[58] Field of Search .................. 43/114; 424/16, 77

[56] References Cited
UNITED STATES PATENTS
2,911,756  11/1959  Geary .................................. 43/114

FOREIGN PATENTS OR APPLICATIONS
615,302  1/1949  Great Britain ........................ 43/114

Primary Examiner—Louis G. Mancene
Assistant Examiner—Daniel J. Leach
Attorney—Kinney, Alexander, Sell, Steldt & Delahunt

[57] ABSTRACT

A strip useful for the entrapping of insects is formed comprising a carrier having coated thereon a normally tacky insect-entangling substance, the surface of said tacky substance being covered with a nontacky material which is cold water soluble, said nontacky material being removed when wet with water, thereby exposing said tacky material. The strip can be used as a tree band for trapping crawling insects or freely hanging for flying insects.

4 Claims, 2 Drawing Figures

WATER-ACTIVATED INSECT TRAP

Many homeowners have a variety of trees which are subject to infestation, such as by various insects which crawl up the tree trunk from the ground area beneath the tree where the insects hibernate over the winter season. Additionally, many moths lay eggs in trees and the resulting larvae move down the tree trunk to the ground as part of their life cycle. It is desirable that these insects or larvae be trapped as they move over the tree trunk to prevent the spread of plant diseases and unsightly defoliation of the trees which can also result in the death of the tree where there is repeated defoliation.

It is difficult for the individual homeowner to overcome insect infestation in the few trees located on his property. Infestation of a small number of trees does not represent a problem which can be cured by large scale spraying of insecticides. Also, because of the possibility of small children in residential areas, it is neither safe nor desirable to use many of the insecticide sprays presently available. A simplified approach to this problem would be the use of a trapping device which prevents ground level, non-flying insects, which move up and down the tree trunk, from infesting the trees, as well as trapping the larvae of such insects that hatch in the foliage of trees and which must traverse the tree trunk to the ground at some stage in their life cycle.

Prior to the present invention, the usual procedure was to apply a very tacky material in a band area around the lower trunk of the tree. One such material useful for forming a tree band is polyisobutylene, commercially available and known as "Bird Tanglefoot" and "Bird Stop," a trademarked product of Tanglefoot Company of Grand Rapids, Michigan. These materials are weakly cohesive but extremely tacky so that any insect which comes in contact with such substance, becomes entrapped.

There are several disadvantages to this material which make its use by the average homeowner less desirable. Being extremely tacky in nature, it is difficult and troublesome to apply and it is difficult to remove at a later time if so desired. Also, once the tacky substance is in place, it is difficult to remove the insects from the tacky substance which necessitates the application of additional bands of tacky material around the tree trunk as the bands become filled with insects.

Briefly, this invention provides a novel means whereby a tacky insect-entrapping material such as polyisobutylene is easily and cleanly applied to a tree trunk, and when the tacky insect-entangling substance has trapped sufficient insects to require replacement of the tree band of this invention it may be easily and cleanly removed and a fresh tree band put in place.

A clearer understanding of the invention may be had by reference to the drawings in which.

Figure 1:
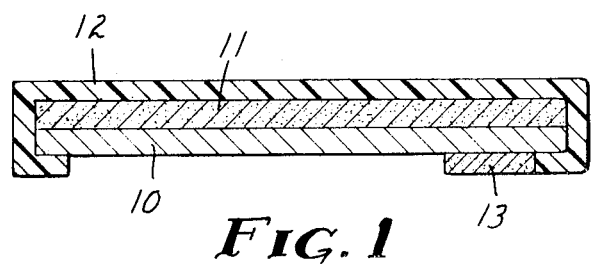
FIG. 1 is a side view in section of a tree band having one tacky surface.

Referring to the accompanying drawing and initially to FIG. 1, a carrier 10 having disposed thereon a tacky insect-entangling substance 11 is covered by a cold water soluble film 12 and sealed such as by heat sealing. The side of the band in contact with the tree has been provided with a layer of pressure sensitive adhesive 13 although said adhesive is not necessary since the band can be held in place by means of clips, fastening the ends of the band together, tying the band to the tree, or dissolving a portion of the nontacky film on the ends of the band and using the underlying tacky substance to hold the ends of the band together or folding the ends of the band so the tacky substance contacts the tree trunk.

Figure 2:
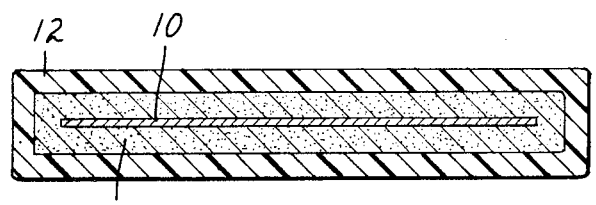
FIG. 2 is a side view in section of a band having tacky substance on both sides.

In FIG. 2 the carrier 10 is surrounded by a continuous layer 11 of tacky substance which is encased in an envelope of a cold water soluble film 12. This embodiment is suitable for hanging in greenhouses etc. where both sides of the band would be exposed when the water soluble film is dissolved.

Among the preferred carrier materials from which a suitable tree band may be constructed are sheets of semi-rigid plastic; for example polyethylene, polypropylene, and the like; metal foil, such as aluminum foil; and paper, treated to render such paper essentially grease and waterproof. Paper is presently most preferred because it is inexpensive, easy to work with, light in weight, and renders the trap more easily disposable. The paper chosen should be of sufficient weight to maintain dimensional stability, for example, 0.009 point board stock which can be treated with wax, polyethylene, silicones, and the like, to give a grease and rain-resistant surface.

A grease-resistant carrier material is desirable to resist migration of the tacky substance coated on the carrier into the carrier substrate which would decrease its availability to insects crawling over or flying into the trap. Water resistance is also desirable as the trap of this invention will be exposed to water upon activation of the water soluble protective layer and can be exposed to rain, dew, and other moisture phenomena typical to exposed environments. The color of the paper is not known to be critical in most cases, but certain colors, e.g., saturn yellow, are known to attract certain insects, e.g., aphides and whiteflies. It is also possible to color the carrier substrate to match the color of tree bark, thereby camouflaging the trap from view and presenting a more attractive appearance.

Tacky substances which catch and thus kill insects is well known in the art, one such substance being "Bird Tanglefoot," a trademarked product of Tanglefoot Company, Grand Rapids, Mich. The tacky substance can be coated on one or both sides of the carrier substrate depending on where the insect trapping band is to be used. For example, a polyisobutylene, i.e., "Bird Tanglefoot," a trademarked product of Tanglefoot Company, Grand Rapids, Mich., coated to a thickness of about 5 mils on a suitable carrier provides a tree band which will effectively trap and hold insects.

To make the insect trapping band of this invention, the tacky material must be covered with a nontacky cold water soluble material. This material renders the trapping band easily handleable prior to actual installation by protecting the tacky insect-entangling substance from contamination by dirt and debris and simultaneously protecting the person handling the insect band from becoming entangled in the tacky insect-entangling substance. Examples of suitable substances for rendering the insect strip nontacky are polyvinyl alcohol films or powders, e.g. Quick Sol A, a trademarked product of Polymer Films Inc., Woodside, N.Y., or polyoxyethylene resin films or powders, e.g. Quick Sol P, a trademarked product of Polymer Films Inc.

The polyvinyl alcohol or polyoxyethylene resin chosen is soluble in cold water so that when the insect band has been placed in the desired location, such as wrapped around a tree trunk, the nontacky covering substance can be dissolved over a short period of time by normal rainfall or more rapidly, if desired, by spraying with cold water, such as an ordinary garden hose or by wiping the surface with cold water, thereby dissolving the water soluble layer and exposing the insect entangling tacky layer. The water soluble protective film chosen should not react with the tacky insect-entangling substance and when the protective film is dissolved, the tacky substance is exposed.

Various means of attaching the tree band to the tree trunk are possible, such as the use of a double coated pressure-sensitive adhesive tape with one layer of adhesive being in contact with the carrier and a second adhesive layer being in contact with the tree trunk. The band can also be overlapped and a portion of the surface which is overlapped activated by use of cold water exposing the tacky substance which would be in contact with the carrier forming a band around a tree trunk, or the tree band could simply be tied in place or held in place by a wire device such as a C-shaped ring snapped around the tree to hold the trap in place. Yet another alternative would be to score the paper stock to allow the trap to be folded back, thus allowing the tacky material to make contact with the tree trunk when said tacky substance is exposed by dissolving the water soluble film. The insect trapping construction can be in the form of a sheet or other forms, however, a band is preferred when the construction is to be used on a tree.

EXAMPLE

Paper, a 0.009 inch thick tag stock was impregnated and coated on both sides with polyethylene was cut into 12-inch wide rolls. The resulting 12-inch strip was printed on both sides with a daylight fluorescent yellow ink (5.6 "Colorlith Poly Yellow", a trademarked product of Colors Ink, Saint Paul, Minn.).

The resulting yellow paper was coated on both sides with polyisobutylene "Bird Tanglefoot", a trademarked product of Tanglefoot Company, to a thickness of 0.003 inch and the resulting double-sided laminate was sandwiched between the 12-inch wide polyvinyl alcohol films Quick Sol A, a trademarked product of Polymer Films Inc., to form a nontacky strip which could be activated by removing the polyvinyl alcohol with cold water. The completed structure had a configuration similar to FIG. 2.

What is claimed is:

1. An insect trapping construction useful for trapping insects comprising a grease proof and waterproof carrier having on at least one side thereof a normally tacky insect-entangling substance, said tacky substance being covered with a water-soluble, nontacky material which is removable by wetting with water, thereby exposing said tacky substance.

2. The insect trapping construction of claim 1 where said carrier is grease proof and waterproof paper.

3. The insect trapping construction of claim 1 where said water-soluble material is polyvinyl alcohol film.

4. The insect trapping construction of claim 1 where said construction is in the form of a band.

* * * * *